Sept. 16, 1941.　　　　M. WAGNER　　　　2,256,069
VEHICLE AXLE SUSPENSION
Filed April 14, 1938　　　2 Sheets-Sheet 1
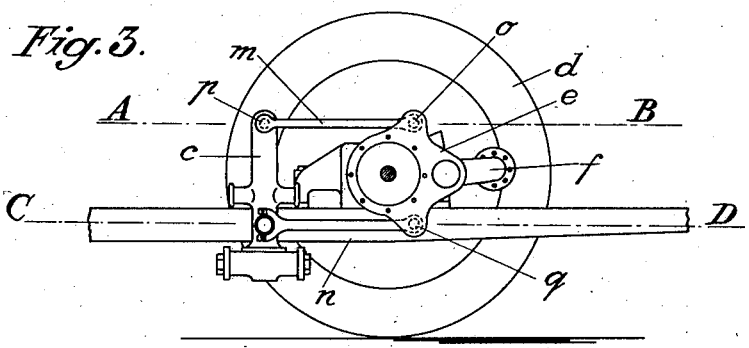
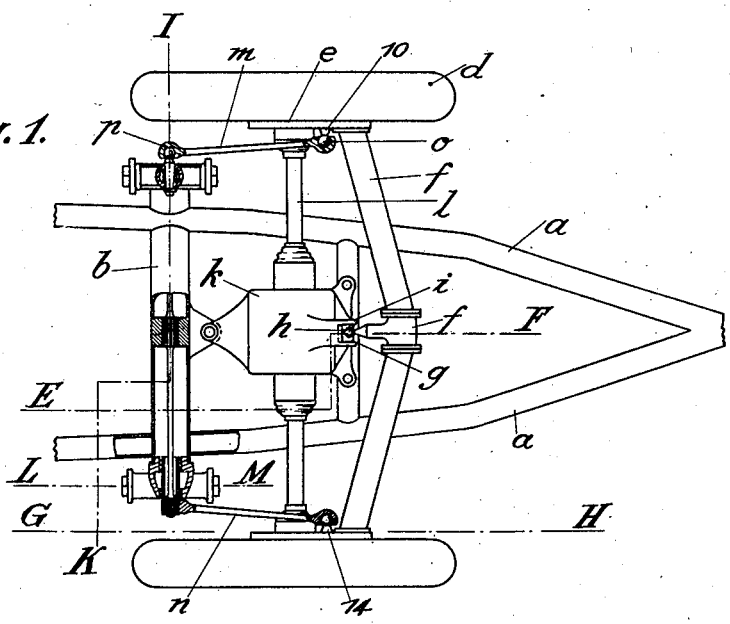
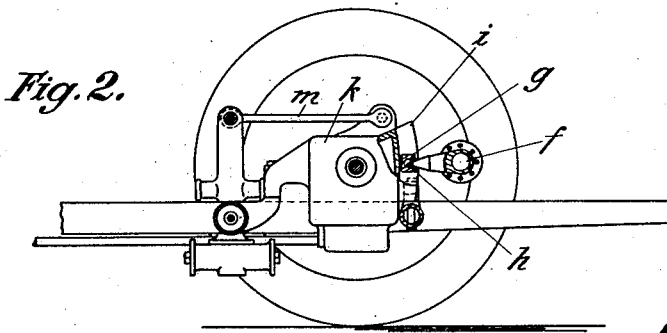
INVENTOR:
Max Wagner Sept. 16, 1941.     M. WAGNER     2,256,069
VEHICLE AXLE SUSPENSION
Filed April 14, 1938     2 Sheets-Sheet 2

INVENTOR:
Max Wagner

Patented Sept. 16, 1941

2,256,069

UNITED STATES PATENT OFFICE 2,256,069

VEHICLE AXLE SUSPENSION

Max Wagner, Stuttgart, Germany, assignor to Daimler-Benz Aktiengesellschaft, Stuttgart-Unterturkheim, Germany, a corporation of Germany Application April 14, 1938, Serial No. 202,029
In Germany April 14, 1937

24 Claims. (Cl. 267—57)

This invention relates to an improved vehicle axle suspension.

An important object of the invention is to support a wheeled axle upon the vehicle frame by link quadrangles, preferably parallelograms, swingable in substantially longitudinal planes of the vehicle, and to support and guide the axle on the frame by central guiding means adapted for taking up transverse forces.

A further object is to connect the links to the frame by ball joints, elastic members or other means, so that they are elastic or flexible in all directions. The elastic members referred to may also serve for the springing of the axle.

Yet another object is to provide an elastic construction of the link members, or of the axle, and particularly a construction possessing torsional elasticity.

By the invention the tendency of the vehicle to roll, and also the tendency of the vehicle to rise or fall under the action of the braking moments arising at the wheels are effectively suppressed by the combined use of a central guide and of link quadrangles acting as thrust stays. At the same time, a constructionally favourable arrangement is achieved since the links, in contrast to the usual thrust stays, can be kept very short. Furthermore, when using parallelograms, the axle can be prevented from making a turning movement which is of advantage for the aforesaid guidance of the axle.

With links pivotable in all directions, an inclined position of the axle relatively to the frame is readily possible, so that the axle can easily yield to one-sided shocks and irregularities in the ground without the frame being forced to follow. Slight twisting of the two wheels relatively to each other, which may then sometimes arise, can in general be taken up simply by the natural capacity of the axle for yielding to torsional stresses.

Other objects are to provide an advantageous arrangement of the axle suspension relatively to the frame whereby a low position of the centre of gravity of the vehicle is achieved and also to provide an appropriate arrangement and construction of the link-mounting means.

An embodiment of the invention by way of example is illustrated in the annexed drawings, in which:

Fig. 1 is a sectional plan of the rear part of a motor vehicle, the upper half of the figure representing a partial section on the line A—B of Figure 3 and the lower half a partial section on the line C—D in Fig. 3.

Fig. 2 a sectional elevation, the section being on the line E—F in Fig. 1;

Fig. 3 is a side view as seen after taking a section on the line G—H in Fig. 1;

Figure 4:
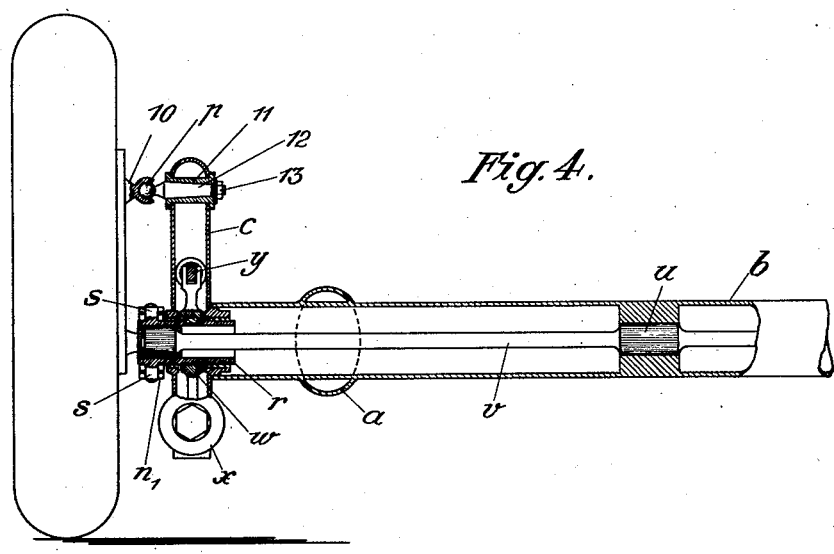
Fig. 4 is a transverse section to a larger scale, the section being taken on the line J—K in Fig. 1.

The low-slung frame consists of two longitudinal beams $a$ connected together by transverse beams, for example the transverse beams $b$ which project laterally beyond the longitudinal beams. The longitudinal and transverse beams are tubular, the transverse beam $b$ penetrating the longitudinal beams and being welded thereto. Welded to the ends of the transverse beams $b$ are hollow vertical mounting brackets $c$ as shown clearly in Fig. 4. The wheels $d$ are mounted upon wheel carriers $e$ which are connected together by a rigid axle $f$ arranged above the frame. The axle is guided in the vertical direction by means of a slider movable in a guideway $i$, the axle being connected to the slider $g$ by a ball joint $h$. The guideway $i$ is located in the central longitudinal plane of the vehicle, and by reason of the joint $h$ it is possible for the axle to swing about a longitudinal axis passing through such joint $h$. The guideway $i$ is disposed on the housing $k$ containing the axle gearing which drives the wheels by means of jointed axle shafts $l$, the said housing being supported on the frame.

Two pairs of links $m$ and $n$ support the wheel carriers $e$ and the axle $f$. The upper link $m$ of a pair is pivoted by means of the ball joints $o$ and $p$ to the wheel carrier and to the upper end of the vertical mounting bracket $c$. The ends of each link $m$ are formed by ball sockets, one of which embraces the pivot 10 on the wheel carrier $e$ and the other a ball on a conical pivot pin 12 which is tightened by nuts 13 in a bush 11. Each lower link $n$ is connected to the wheel carrier $e$ by a ball joint $q$, that end of the link being formed as a ball socket for engaging the ball-shaped head of the stud 14 mounted on the wheel carrier $e$. The connection of the lower links $n$ to the frame, however, is effected in the following fashion: Mounted in the ends of the transverse beam $b$, or in a bore of each vertical mounting bracket $c$ located axially in relation to the transverse beam, is a tubular pivot $r$, see Figure 4, which is provided with radial pivot pins $s$ for connection with the fork-shaped end $n_1$ of the link $n$. The sleeve $r$ further possesses internal teeth for coupling to a torsion rod spring $v$, the latter being similarly attached against rotation within the beam $b$ at $u$. The torsion rod $v$ serves for the springing of the wheels and axle. In the drawings, the same spring rod $v$ is used for both sides, but separate springs may be employed for respective sides, if desired.

Figure 5:
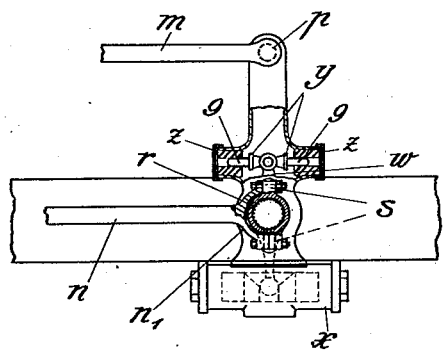
Fig. 5 is a fragmental sectional side elevation of parts in Figure 4, the section being on the line L—M in Fig. 1.

Non-rotatably mounted upon the hollow pivot $r$ and within the hollow bracket $c$ is a two-armed lever $w$ which, with its lower arm, operates a shock absorber $x$ (see Figure 5). The upper arm carries two small rods $9$, pivotally connected to it, the rods $9$ having stops $y$ which, after a predetermined movement, abut against annular rubber cushions $z$ and thereby elastically limit the movement of the link $n$ upwardly and downwardly.

During a uniform lifting movement of the two wheels $d$, the axle is guided in the guideway $i$ parallel to the frame, whilst the link $n$ stresses the spring $v$ in torsion by means of the pivot joint $n_1, s$. During a non-uniform lifting movement of the wheels, the axle can additionally turn about a longitudinal axis passing through the ball joint $h$, the ball joints, $p, o, q$ and the pivot joint $n_1, s$ coacting with the spring $v$ to permit the wheels to assume an inclined position relatively to the frame. For this purpose, there must be sufficient play in the sliding guide $i$ in the longitudinal direction of the vehicle to correspond to the shortening of the distance between the transverse bearer $b$ and the guide-pivot $g$ due to the swinging movement of the links $m, n$. In the example illustrated, the guide $i$ is formed as an arc for this purpose, as will be seen from Figure 3.

The springs $v$, the means for operating the shock absorbers and the limiting stops $z$ are thus disposed in particularly advantageous fashion inside hollow frame members where they are protected against damage and occupy no additional space. However, they may be arranged in other fashion, and, for example, any other desired springs, such as leaf springs, helical springs, rubber springs, hydraulic or pneumatic springs or the like, may be employed instead of torsion rod springs. If desired, the central guidance may be effected by means of elastic rollers or the like instead of by means of a sliding block $g$. Finally the axle $f$ need not be completely rigid but may in some cases be made more or less yielding in itself, as may also the links $m$ and $n$. Additionally, it will be clear and obvious that the term "frame" as used in the description and claims need not be construed as limited to a construction separate from the vehicle body, but may include those cases in which the "frame" is integral with said body, as in the so-called "frameless" constructions.

It will accordingly be seen that I have provided a construction which satisfies the objects of the invention, and while I have shown the invention in a certain physical embodiment, it is to be understood that modifications of the structure may be made by those skilled in this art without departing from the invention as expressed in the claims which follow.

I claim:

1. In a vehicle having a frame, a stiff axle, road wheels rotatably mounted on opposite ends of said axle, said frame being positioned beneath said axle and the center of said wheels, a pair of links on each side of the frame, each pair pivotally connected at one end with the frame and at their other end to said axle, and forming with said axle and frame a link quadrilateral for guiding the respective ends of said axle relatively to the frame, and means for resisting transverse movement of said axle.

2. In a vehicle having a frame, a stiff axle, road wheels rotatably mounted on opposite ends of said axle, said frame being positioned beneath said axle and the center of said wheels, a pair of links on each side of the frame, each pair connected at one end to said axle, rotary spring means attached at one end to said frame, means for pivotally connecting the other end of one link of each pair to the other end of said rotary spring means for movement about a substantially vertical axis, means for pivotally connecting the other end of the other link of each pair to said frame, and means for resisting transverse movement of said axle.

3. In a vehicle having a frame, a stiff axle, road wheels rotatably mounted on opposite ends of said axle, a pair of links on each side of the frame, each pair connected at one end to said axle, rotary spring means attached at one end to said frame, means for pivotally connecting the other end of one link of each pair to the other end of said rotary spring means for movement about a substantially vertical axis, means for pivotally connecting the other end of the other link of each pair to said frame, means for resisting transverse movement of said axle, a substantially vertical arm rigidly attached to each end of the rotary spring means, a rod pivotally connected at its center to said arm, stops on said rod on each side of said arm, and a pair of resilient abutments having openings for receiving the ends of said rod and adapted to cooperate with said stops to supplement said rotary spring means in resisting relative movement between said axle and said frame.

4. In a vehicle having a frame, a stiff axle, road wheels rotatably mounted on opposite ends of said axle, a pair of links on each side of the frame, each pair connected at one end to said axle, rotary spring means attached at one end to said frame, means for pivotally connecting the other end of one link of each pair to the other end of said rotary spring means for movement about a substantially vertical axis, said last means including a hollow trunnion fixed against rotation relative to the rotary spring means and mounted on the end thereof, radial pivot pins extending from said hollow trunnion, to which said links are pivotally connected, means for pivotally connecting the other end of the other link of each pair to said frame, and means for resisting transverse movement of said axle.

5. In a vehicle having a frame, a stiff axle, road wheels rotatably mounted on opposite ends of said axle, a pair of links on each side of the frame, each pair connected at one end to said axle, rotary spring means attached at one end to said frame, means for pivotally connecting the other end of one link of each pair to the other end of said rotary spring means for movement about a substantially vertical axis, said last means including a hollow trunnion fixed against rotation relative to the rotary spring means and mounted on the end thereof, radial pivot pins extending from said hollow trunnion, to which said links are pivotally connected, arms fixedly extending from said hollow trunnion, and shock absorbers mounted on said frame for actuation by said arms, means for pivotally connecting the other end of the other link of each pair to said frame, and means for resisting transverse movement of said axle.

6. In a vehicle, a frame comprising a pair of longitudinal beams and at least one transverse beam extending outwardly beyond said longitudinal beams on either side of the vehicle, a vertically extending support mounted on each end of said transverse beam, a stiff axle, road wheels mounted on opposite ends of said axle, a pair of superposed links on each side of the frame pivotally connected at one end to said axle, means for pivoting the other end of the upper link of each pair to the upper end of the corresponding support, and means for pivoting the lower link of each pair to the respective end of said transverse beam.

7. The combination according to claim 6, in combination with rotary spring means attached to said frame and one link of each pair for resisting relative motion between said axle and said frame.

8. The combination according to claim 6, in which the means for pivoting the upper link to the upper end of the bracket comprises a conical pivot pin, a spherical joint connecting the larger end of said pivot pin to said links, bearing means on said bracket for receiving said conical end, and means for retaining said pin in said bearing.

9. The combination according to claim 6, in which said frame extends beneath the axle and wheel centers.

10. The combination according to claim 6, in combination with a torsion spring housed within and attached at its center to said transverse beam, and means for attaching the ends of said torsion spring to the lower link of each pair.

11. The combination according to claim 6, in which said support is formed hollow, and a shock absorber mounted within said support and operatively connected between the lower link and the frame.

12. In a vehicle having a frame, a stiff axle, road wheels rotatably mounted on opposite ends of said axle, means for resisting transverse movement of said axle relative to said frame, while permitting vertical movement and swinging movement of the axle in a transverse plane of the vehicle, a pair of links arranged one above the other on each side of the central longitudinal plane of the vehicle, extending substantially in a longitudinal direction of the vehicle, each link pivotally connected at one end with the frame and at its other end to said axle in such a manner that each pair of links form with said axle and frame a link quadrilateral for positively guiding the respective ends of said axle relatively to the frame, while permitting said swinging movement of the axle in a transverse plane of the vehicle, said links being so short that their ends pivotally connected to the frame are situated within the outer circumference of the road wheels, when viewed from the side of the vehicle, and springing means for springing the axle with respect to the frame.

13. In a vehicle having a frame, a stiff axle, road wheels rotatably mounted on opposite ends of said axle, means for resisting transverse movement of said axle relative to said frame, while permitting vertical movement and swinging movement of the axle in a transverse plane of the vehicle, a pair of links arranged one above the other on each side of the central longitudinal plane of the vehicle, universal joints pivotally connecting each link with the axle, joints connecting each link with the frame for permitting relative turning movement about an axis substantially transverse to the vehicle and a substantially vertical axis, in such a manner that each pair of links form with said axle and frame a link quadrilateral for positively guiding the respective ends of said axle relatively to the frame, while permitting said swinging of the axle in a transverse plane of the vehicle, and torsion rods for springing the axle with respect to the frame, arranged on the frame substantially co-axially with one of said joints connecting one of said links with the frame, said joints comprising coupling means between said link and one end of said torsion rod in such a manner that the link is non-rotatably connected to said torsion rod about the axis of the torsion rod, but movable relatively to the torsion rod about a substantially vertical axis.

14. In a vehicle having a frame, a single stiff rear axle, road wheels rotatably mounted on opposite ends of said axle, a pair of link members on each side of the frame connecting the axle to the frame and arranged in front of said axle, so as to form with said axle and frame a link quadrilateral, means for supporting the axle against transverse movement, while permitting movement thereof in all other direction, spring means for springing the axle relative to the frame, an axle drive mounted on the frame between the wheels, and laterally extending drive shafts for driving the wheels from said axle drive.

15. In a vehicle having a frame, a single stiff rear axle, road wheels rotatably mounted on opposite ends of said axle, a rear axle gear casing fixed to the frame between the road wheels, means for driving the road wheels from said gear casing, said rear axle being bent rearwardly about said gear casing, a pair of link members on each side of the frame connecting the axle to the frame and arranged in front of said axle, so as to form with said axle and frame a link quadrilateral, means for supporting the axle against transverse movement arranged on the rear side of said gear casing between the road wheels, so as to allow an up and down movement of the axle as well as a swinging movement about a longitudinal axis of the vehicle, and spring means for springing the axle relative to the frame.

16. In a vehicle having a frame, a stiff axle, road wheels rotatably mounted on opposite ends of said axle, means for guiding said axle relatively to said frame for parallel motion in a substantially vertical plane, elastic stops on each side of the central longitudinal plane of the vehicle for limiting the movement of each end of said stiff axle, means springing said axle against said frame in a vertical direction, said guiding means and said springing means being so constructed as to allow a transverse movement of the axle, and a swinging movement thereof about a longitudinal axis relatively to the frame, and means for supporting said axle against transverse movement relative to the frame, while still permitting said swinging movement about a longitudinal axis.

17. In a vehicle having a frame, a stiff axle, road wheels rotatably mounted on opposite ends of said axle, means for resisting transverse movement of said axle relative to said frame, while permitting vertical movement and swinging movement of the axle in a transverse plane of the vehicle, a pair of links arranged one above the other on each side of the central longitudinal plane of the vehicle, extending substantially in a longitudinal direction of the vehicle, each link pivotally connected at one end with the frame and at its other end to said axle in such a manner that each pair of links form with said axle and frame a link quadrilateral for positively guiding the respective ends of said axle relatively to the frame, while permitting said swinging movement of the axle in a transverse plane of the vehicle, elastic stops on each side of the central longitudinal plane of the vehicle for limiting the movement of each pair of guiding links for the stiff axle, and springing means for springing the axle with respect to the frame.

18. In a vehicle having a frame, a stiff axle, road wheels rotatably mounted on opposite ends of said axle, means for resisting transverse movement of said axle relative to said frame, while permitting vertical movement and swinging movement of the axle in a transverse plane of the vehicle, a pair of links arranged one above the other on each side of the central longitudinal plane of the vehicle, extending substantially in a longitudinal direction of the vehicle, each link pivotally connected at one end with the frame and at its other end to said axle in such a manner that each pair of links form with said axle and frame a link quadrilateral for positively guiding the respective ends of said axle relatively to the frame, while permitting said swinging movement of the axle in a transverse plane of the vehicle, and torsion spring means for springing the axle with respect to the frame, arranged co-axially to the pivotal axis of one of each pair of links on the frame, one end of said torsion spring means being non-rotatably coupled to the frame and the other end to said link.

19. In a vehicle having a frame, a road wheel, a supporting link attached on one end to said wheel, a substantially horizontal shaft member rotatably supported on the frame, a torsion spring member non-rotatably connected at one end to said frame and at the other end to said shaft member, at least one radial pivot member on said shaft member, a corresponding pivot member on the second end of said supporting link, said two pivot members directly coupling said link to said shaft member so as to allow the link to carry out a swinging movement relative to the shaft member and to the corresponding end of said torsion spring member solely about the axis of said pivot members, said axis extending substantially vertically, a shock absorber mounted on the frame, and an arm on said shaft member for actuating said shock absorber.

20. In a vehicle having a frame, a road wheel, a supporting link attached at one end to said wheel, a substantially horizontal shaft member rotatably supported on the frame, a torsion spring member non-rotatably connected at one end to said frame and at the other end to said shaft member, at least one radial pivot member on said shaft member, a corresponding pivot member on the other end of said supporting link, said two pivot members directly coupling said link to said shaft member, so as to allow the link to carry out a swinging movement relative to said shaft member and to the corresponding end of said torsion spring member, solely about the axis of said pivot member, said axis extending substantially vertically, stops on said shaft member, and cooperating stops on said frame for limiting the rotating movement of the shaft member with respect to the frame.

21. The combination according to claim 19, in combination with stops on said shaft member, and cooperating stops on the frame for limiting the rotating movement of the shaft member with respect to the frame.

22. In a vehicle having a frame, a stiff axle, road wheels rotatably mounted on opposite ends of said axle, means for guiding said axle relatively to said frame in a vertical direction and for simultaneously resisting transverse movement of said axle relative to said frame, said means defining a longitudinal swinging axis lying substantially in the longitudinal central plane of the vehicle for swinging movement of the axle in a transverse plane about said longitudinal swinging axis, a pair of links arranged one above the other on each side of the central longitudinal plane of the vehicle and extending substantially in a longitudinal direction of the vehicle, each link pivotally connected at one end with the frame and at its other end to said axle in such a manner that each pair of links forms with said axle and frame a link quadrilateral for abutting the respective ends of said axle relatively to the frame in a longitudinal direction of the vehicle and about a transverse axis of the vehicle, said link quadrilateral being yieldable in the transverse direction so as to permit such swinging movement of the axle about said longitudinal axis lying in the central longitudinal plane of the vehicle, and springing means for springing the axle with respect to the frame.

23. The combination according to claim 22, in which said pairs of link members are arranged forwardly of said axle, whereby the driving thrust forces from the rear axle are transferred to said frame by means of said link quadrilateral.

24. The combination according to claim 22, in which each link is pivotally connected to the axle by a universal joint, and pivotally connected to the frame for movement about relatively transverse and perpendicular axes.

MAX WAGNER.